No. 742,552. PATENTED OCT. 27, 1903.
C. W. ANDERSON.
SHOCK LOADER.
APPLICATION FILED FEB. 21, 1903.
NO MODEL. 3 SHEETS—SHEET 1.
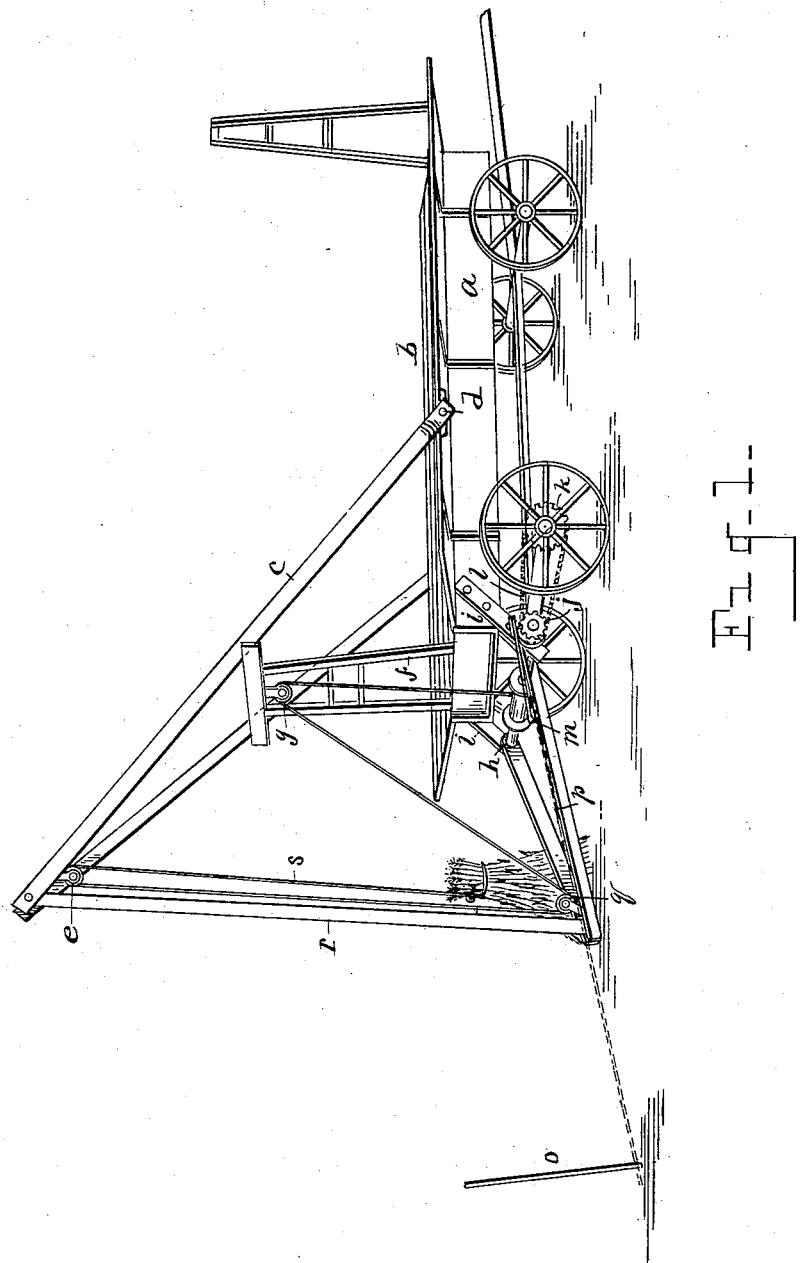

No. 742,552. PATENTED OCT. 27, 1903.
C. W. ANDERSON.
SHOCK LOADER.
APPLICATION FILED FEB. 21, 1903.
NO MODEL.
3 SHEETS—SHEET 2.

WITNESSES:
INVENTOR.
Charles Waldo Anderson
BY
ATTORNEY.

No. 742,552. PATENTED OCT. 27, 1903.
C. W. ANDERSON.
SHOCK LOADER.
APPLICATION FILED FEB. 21, 1903.
NO MODEL. 3 SHEETS—SHEET 3.
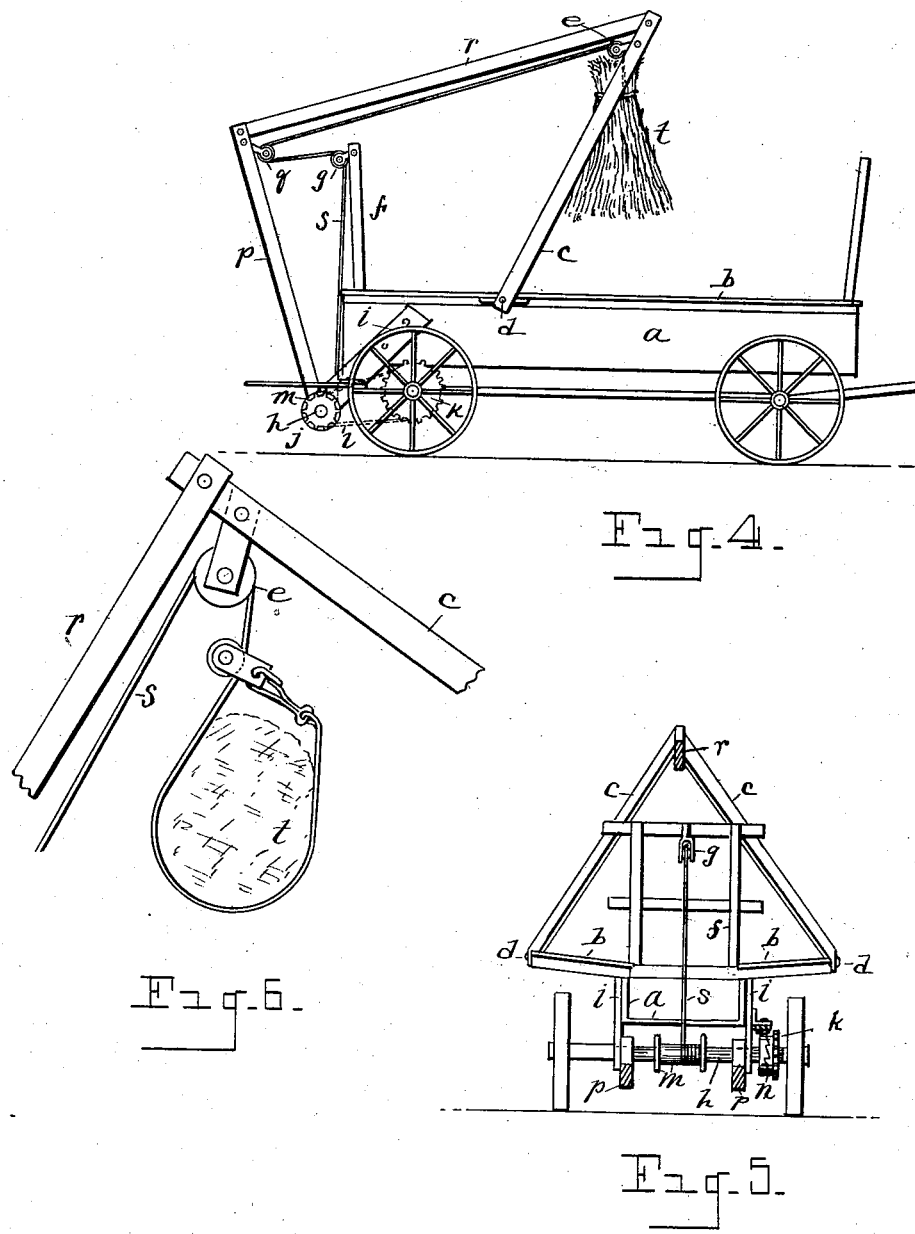

No. 742,552. Patented October 27, 1903.

UNITED STATES PATENT OFFICE.

CHARLES WALDO ANDERSON, OF ALBION, MICHIGAN.

SHOCK-LOADER.

SPECIFICATION forming part of Letters Patent No. 742,552, dated October 27, 1903.

Application filed February 21, 1903. Serial No. 144,382. (No model.)

*To all whom it may concern:*

Be it known that I, CHARLES WALDO ANDERSON, a citizen of the United States, residing at Albion, county of Calhoun, State of Michigan, have invented a certain new and useful Improvement in Shock-Loaders, of which the following is a specification, reference being had to the accompanying drawings, which form a part of this specification.

My invention is designed to provide a shock-loader of superior simplicity, efficiency, and utility; and it consists of the construction, combination, and arrangement of devices hereinafter described and claimed, and illustrated in the accompanying drawings, in which—

Figure 3:
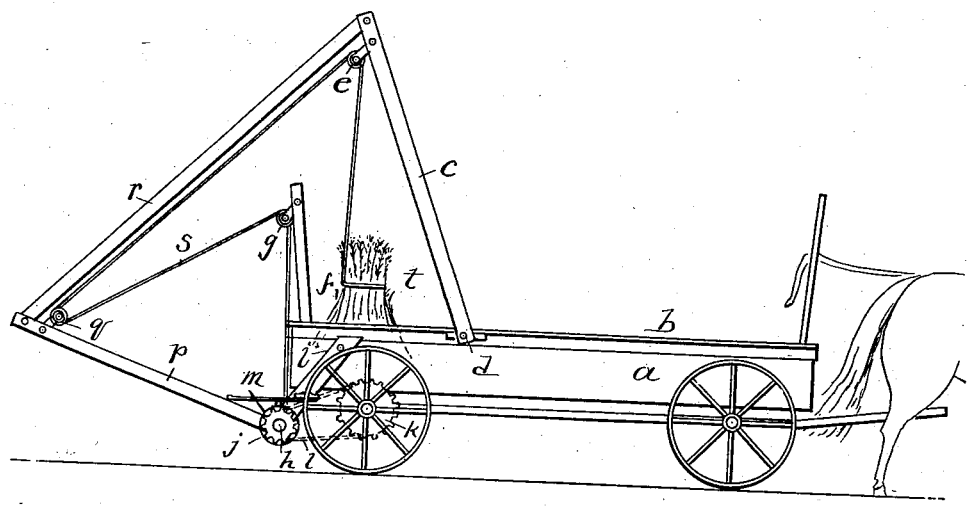
Figure 2:
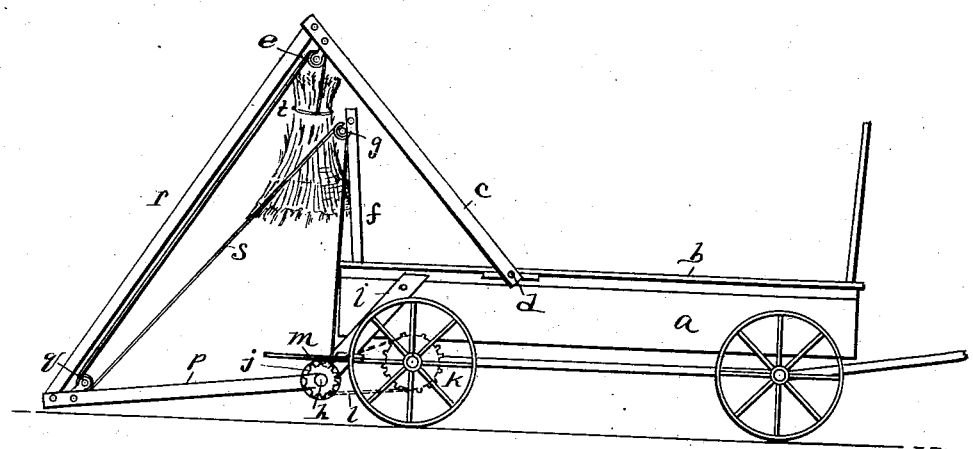

Figure 1 is a view in perspective, showing my invention applied to any suitable vehicle, the same showing the shock in its initial movement. Fig. 2 is a view in side elevation, showing the shock elevated to the top of the swinging crane. Fig. 3 is a view in side elevation, showing the shock dropped toward the rear of the vehicle. Fig. 4 is a side elevation showing the shock carried over toward the front of the vehicle. Fig. 5 is a view in rear elevation, showing parts in vertical section. Fig. 6 is a detail view showing the loop for engaging the shock.

More particularly my invention is designed to provide a shock-loader for loading shocks of corn upon a vehicle or hay-rigging or similar device, the apparatus being so constructed and arranged that when a shock of corn has been engaged thereby it will be elevated and deposited upon the rigging by the power exerted by the team drawing the rigging forward or otherwise, as may be desired.

My improved apparatus is designed to engage any ordinary-sized shock of corn and place it in any part of the wagon or vehicle, the power, as above observed, coming from the movement of the wagon, as in going from one shock to another, or from any other source. It will be obvious that an apparatus that will accomplish this purpose will effect a great saving of labor in loading corn in the shock to draw the same to a corn-husker or to the barn.

While I have shown my invention to be actuated by the movement of the wagon, I do not limit myself solely thereto, as my invention contemplates as coming within the scope thereof the use of any desired power for the operation of the apparatus. So, also, I have shown in the accompanying drawings the apparatus so attached to the vehicle that the swinging parts move longitudinally of the vehicle; but I would have it understood that I do not limit myself solely thereto. As shown in the drawings, portions of the apparatus are attached to the end of the vehicle, the two arms of the swinging crane being pivotally supported upon the two sides of the hay-rigging; but I would have it understood that my invention might be attached to the vehicle in any desired manner, at the side of the vehicle, if desired, as well as at the end thereof.

I carry out my invention as follows: In the drawings submitted herewith $a$ indicates a wagon provided with a hay-rigging $b$. Supported upon the hay-rigging is a crane $c$, preferably constructed with two arms diverging toward their lower ends and pivotally connected at their lower ends at the sides of the rigging, as indicated at $d$. I do not, however, limit myself to having the lower ends of the arms of the crane diverge, as the arms might be brought up parallel and connected with a cross-bar at their upper ends.

Toward the top of the swinging crane is supported any suitable pulley mechanism, (indicated at $e$.) In the drawings is shown also at the rear end of the rigging a rear standard or frame, (indicated at $f$,) to which is shown attached a pulley mechanism, (indicated at $g$.) To the body of the rigging, at the rear end thereof, I have also shown a shaft $h$ attached thereto, as by means of arms $i$, in which said shaft is supported, said shaft being preferably geared with the hub of one of the rear wheels. For this purpose I prefer to locate upon the adjacent hub and upon the adjacent end of the shaft sprocket-gears $j\,k$, connected by a sprocket-chain $l$. I prefer also to locate upon said shaft a drum $m$. Upon said shaft I prefer also to locate clutch mechanism, (indicated at $n$,) whereby the said shaft may be thrown out of engagement with the adjacent sprocket-wheel and whereby when the clutch mechanism is in operation the shaft will be rotated. A swinging frame $p$ is shown having one extremity thereof preferably engaged upon said shaft, so as to swing thereupon. The swinging frame is provided toward its opposite end with pulley mechanism $q$. I prefer also to connect the outer ends of the swinging frame and of the swinging crane by a bar $r$. A suitable rope or cable $s$ is rove through the pulley mechanisms above described, one end of said cable being provided with a loop $t$ or other suitable means of engaging a shock, said cable toward its opposite end being engaged with the drum already described, or the cable might simply be extended about said drum without being fastened thereto, the extremity of the cable opposite said loop being held in any suitable manner—as, for example, by means of an attendant with a bar $o$, as shown, to hold the adjacent end of the cable securely. If the cable were secured to the drum, however, it would not be necessary to have it held in any other manner.

The apparatus as so constructed operates in the following manner: The loop of the cable being attached to the shock and the opposite end of the cable being held securely either by its attachment to the drum or otherwise, when the vehicle is moved forward the shock will first be elevated up to the pulley mechanism at the top of the swinging crane. Then on the further continued movement of the vehicle the swinging frame and the swinging crane would be drawn over toward the front end of the vehicle, carrying the shock therewith to any desired position on the rigging, when by releasing the clutch above described the shock would drop by its own gravity into the rigging. It will be evident that the apparatus can be readily swung back into position to be engaged with another shock. It is evident that by means of the swinging crane and the pulley mechanism attached thereto with the cable over the pulley mechanism and constructed to engage the shock any suitable power might be attached to the crane to elevate the shock and deposit it upon the rigging. Instead of having a clutch to engage the sprocket-wheel upon the shaft, as above described, it is evident that the same result might be obtained by providing the shaft and the drum with suitable clutch mechanism.

In case it was preferred to attach the apparatus to the side of the vehicle the swinging frame and the shaft with which it is engaged might be attached to the side of the box of the rigging and the swinging crane be secured to either side of the rigging.

It will be seen that by attaching the shaft and the swinging frame to the rear end of the vehicle body or rigging and having the power exerted in a direction longitudinally thereof there is no liability of any tipping of the vehicle. It will also be evident that the apparatus may be engaged with a shock of corn on either side of the vehicle.

It will be evident that by using some other source of power than that of the movement of the vehicle this apparatus could be used—as in a barn, for example—for unloading hay and other fodder, as the operation of the mechanism might be reversed.

What I claim as my invention is—

1. A shock-loader having in combination with a vehicle body or rigging a swinging crane, pulley mechanism secured to said crane, a swinging frame secured to the rear end of the vehicle body or rigging, pulley mechanism connected therewith, a bar connecting the outer end of the swinging frame and swinging crane, and a cable rove over said pulley mechanism provided with means to engage a shock.

2. A shock-loader having in combination with a vehicle body or rigging a swinging crane, pulley mechanism secured thereto, a shaft secured to the vehicle body or rigging, a swinging frame journaled upon said shaft, a bar connecting the swinging frame and the swinging crane, pulley mechanism upon the swinging frame, a drum upon said shaft, and a cable rove over the pulley mechanism and over said drum, said cable provided with means to engage a shock.

3. A shock-loader having in combination with a vehicle body or rigging a swinging crane, pulley mechanism secured thereto, a vertical frame secured to the body or rigging, pulley mechanism secured to said vertical frame, and a shaft secured to the body or rigging and geared with the hub of one of the vehicle-wheels, a swinging frame journaled upon said shaft, a pulley secured to the swinging frame, and a drum upon said shaft, a bar connecting the swinging frame and the swinging crane, and a cable rove over the pulley mechanisms and over said cable, said cable provided with means to engage a shock.

4. A shock-loader having in combination with a vehicle body or rigging a swinging crane, pulley mechanism secured thereto, a vertical frame secured to the body or rigging, pulley mechanism secured to said vertical frame, a shaft secured to the body or rigging and geared with the hub of one of the wheels, a swinging frame journaled upon said shaft, a pulley secured to the swinging frame, a bar connecting the swinging frame and the swinging crane, and a cable rove over the pulley mechanisms and over said cable, said cable provided with means to engage a shock.

5. A shock-loader having in combination with a vehicle body or rigging a swinging crane secured to the body or rigging intermediate the ends thereof provided with pulley mechanism, a swinging frame engaged with the rear end of the body or rigging provided with pulley mechanisms, a cable rove over the pulley mechanisms and provided with means for engaging a shock, and means whereby the crane will be actuated by the forward movement of the vehicle.

In testimony whereof I have signed this specification in the presence of two subscribing witnesses.

CHARLES WALDO ANDERSON.

Witnesses:
N. S. WRIGHT,
M. N. STRUBLE.